United States Patent
Wilson et al.

(10) Patent No.: US 9,495,735 B2
(45) Date of Patent: *Nov. 15, 2016

(54) DOCUMENT UNBENDING SYSTEMS AND METHODS

(75) Inventors: Scott E. Wilson, Portland, OR (US);
Peter W. Hildebrandt, Duluth, GA (US)

(73) Assignee: STEELCASE INC., Grand Rapids, MI (US)

(*) Notice: Subject to any disclaimer, the term of this patent is extended or adjusted under 35 U.S.C. 154(b) by 261 days.

This patent is subject to a terminal disclaimer.

(21) Appl. No.: 14/122,939

(22) PCT Filed: May 31, 2012

(86) PCT No.: PCT/US2012/040302
§ 371 (c)(1),
(2), (4) Date: Mar. 21, 2014

(87) PCT Pub. No.: WO2012/166982
PCT Pub. Date: Dec. 6, 2012

(65) Prior Publication Data
US 2014/0198981 A1   Jul. 17, 2014

Related U.S. Application Data

(60) Provisional application No. 61/491,690, filed on May 31, 2011.

(51) Int. Cl.
*G06K 9/00* (2006.01)
*G06T 5/00* (2006.01)
(Continued)

(52) U.S. Cl.
CPC ............ *G06T 5/006* (2013.01); *G06K 9/3283* (2013.01); *G06T 3/0031* (2013.01); *G06T 7/408* (2013.01); *G06T 11/60* (2013.01); *G06K 2009/363* (2013.01)

(58) Field of Classification Search
None
See application file for complete search history.

(56) References Cited

U.S. PATENT DOCUMENTS 5,870,505 A * 2/1999 Wober .................. G06T 5/20
358/447
5,974,199 A * 10/1999 Lee ................... H04N 1/00795
382/289

(Continued)

OTHER PUBLICATIONS

Brown, M.S.; Seales, W.B., "Image restoration of arbitrarily warped documents," in Pattern Analysis and Machine Intelligence, IEEE Transactions on , vol. 26, No. 10, pp. 1295-1306, Oct. 2004.*

(Continued)

*Primary Examiner* — Andrae S Allison
(74) *Attorney, Agent, or Firm* — Troutman Sanders LLP; Ryan A. Schneider; Christopher W. Glass

(57) ABSTRACT

Embodiments of a processing systems and methods can unbend an image of facing pages of a bound book. An exemplary processing system can comprise an edge-detection unit, a keystone-correction unit, a flattening unit, and a conversion unit. After an image is received by the processing system, the image can be processed in turn by each unit. The edge-detection unit can identify edges of a document in the image. The keystone-correction unit can reduce or remove keystoning in the image, thereby correcting horizontal distortion of the document. The flattening unit can flatten or straighten text or objects in the image, thereby correcting vertical distortion of the document. The conversion unit can convert the image to a desired color profile. Accordingly, the processing system can process an original image into a more easily readable and digitally manipulable image.

20 Claims, 8 Drawing Sheets

(51) Int. Cl.
  *G06T 11/60*  (2006.01)
  *G06K 9/32*  (2006.01)
  *G06T 3/00*  (2006.01)
  *G06T 7/40*  (2006.01)
  *G06K 9/36*  (2006.01)

(56) References Cited

U.S. PATENT DOCUMENTS

| | | | |
|---|---|---|---|
| 6,185,342 B1* | 2/2001 | Hamburg | G06T 11/00 382/283 |
| 6,470,101 B1* | 10/2002 | Nakamura | H04N 1/00795 382/148 |
| 7,489,832 B2* | 2/2009 | Makino | G06K 9/3241 382/287 |
| 2001/0014193 A1 | 8/2001 | Sansom-Wai et al. | |
| 2005/0190986 A1* | 9/2005 | Sakurai | G06T 3/0006 382/275 |
| 2005/0206753 A1 | 9/2005 | Sakurai et al. | |
| 2009/0257498 A1 | 10/2009 | Kurata | |
| 2010/0014782 A1* | 1/2010 | Fero | H04N 1/387 382/290 |
| 2010/0195933 A1 | 8/2010 | Nafarieh | |
| 2010/0215266 A1 | 8/2010 | Higuchi | |
| 2010/0225937 A1 | 9/2010 | Simske et al. | |
| 2013/0343609 A1* | 12/2013 | Wilson | G06K 9/00463 382/103 |

OTHER PUBLICATIONS

Shijian Lu; Tan, C.L., "Document Flattening through Grid Modeling and Regularization," in Pattern Recognition, 2006. ICPR 2006. 18th International Conference on , vol. 1, No., pp. 971-974.*

Brown, M.S.; Pisula, C.J., "Conformal deskewing of non-planar documents," in Computer Vision and Pattern Recognition, 2005. CVPR 2005. IEEE Computer Society Conference on , vol. 1, No., pp. 998-1004 vol. 1, Jun. 20-25, 2005.*

Jian Liang; DeMenthon, D.; Doermann, D., "Flattening curved documents in images," in Computer Vision and Pattern Recognition, 2005. CVPR 2005. IEEE Computer Society Conference on , vol. 2, No., pp. 338-345 vol. 2, Jun. 20-25, 2005.*

Papandreou, A., and Basilios Gatos. "A novel skew detection technique based on vertical projections." Document Analysis and Recognition (ICDAR), 2011 International Conference on. IEEE, 2011.*

Liang, Jian, Daniel DeMenthon, and David Doermann. "Flattening curved documents in images." Computer Vision and Pattern Recognition, 2005. CVPR 2005. IEEE Computer Society Conference on. vol. 2. IEEE, 2005.*

Shafait, Faisal, and Thomas M. Breuel. "Document image dewarping contest." 2nd Int. Workshop on Camera-Based Document Analysis and Recognition, Curitiba, Brazil. 2007.*

International Preliminary Report on Patentability dated Apr. 3, 2014 for related PCT Application No. PCT/US2012/040302.

International Search Report and Written Opinion mailed May 21, 2013 for priority application PCT/US2012/040602.

* cited by examiner

DOCUMENT UNBENDING SYSTEMS AND METHODS

CROSS-REFERENCE TO RELATED APPLICATION

This application is a United States National Stage Application of, and claims the benefit pursuant to 35 U.S.C. 371 of, International Patent Application Serial No. PCT/US2012/040302, filed on 31 May 2012, which claims priority to and the benefit under 35 U.S.C. §119(e) of U.S. Provisional Patent Application No. 61/491,690, filed 31 May 2011, the disclosures of which are incorporated herein by reference in their entireties as if fully set forth below.

TECHNICAL FIELD

Various embodiments of the present invention relate to image processing and, more particularly, to systems and methods for unbending pages of a book appearing in an image.

BACKGROUND

As electronic books become more popular, some companies and individuals are conducting processes to convert paper books into electronic format. A step in this process is often capturing an image of a page of book. After the image is captured, it may be desirable to process the image to make the text of the book more readable.

SUMMARY

There is a need for processing systems and methods for processing images of physical documents, such as book pages, to increase readability and aesthetic appeal. It is to such systems and methods that various embodiments of the invention are directed.

Briefly described, various embodiments of the invention are processing systems and methods, or image-processing systems and methods, for processing an image so as to virtually unbend the pages of a document within the image. These embodiments can be particularly useful for processing images of books, which images often appear distorted as a result of the book's spine preventing the pages from lying within a plane during image capture. An exemplary embodiment of the processing system can comprise an edge-detection unit, a keystone-correction unit, a flattening unit, and a conversion unit.

After an image is captured of a document, the edge detection unit can identify edges of the document in the image. In an exemplary embodiment, one or more edge-finding filters can be applied to the image. One of the edge-finding filters can be a convolution filter. For the convolution filter, a plurality of potential edges can be identified and then ranked by a predetermined algorithm to identify the most likely potential edges of the book. The highest ranked potential edges proximate each of the four sides of the image can be deemed edges of the document. If multiple edge-finding algorithms are used, then the edge-detection unit can rank the resulting potential edges and select a subset of the potential edges to identify as edges of the document.

The keystone correction unit can reduce or correct keystone distortion in the image. Various methods can be used to correct keystoning in the image. For a first example, if the field of view of the image-capture device used to capture the image is known, then that field of view can be used to calculate a series of rotations to apply to the image, so as to make the document appear flat. For a second example, after the edges of the document are detected, the corners of the document can be identified based on those edges. The keystone-correction unit can then distort the image so as to position the corners to form a rectangle. After keystone-correction, it can be assumed that the left and right edges of the document are straight and vertical. If either or both of these edges are not straight at this point, some exemplary embodiments of the keystone-correction unit can replace the curved left or right edge with a straight vertical line between the appropriate corners of the document.

The flattening unit can reduce the curve of the text that generally results from the pages of a bound book being bent away from the binding to the surface upon which the book sits. To flatten the source image, the flattening unit can generate a destination image. For each pixel in the destination image, the flattening unit can choose a pixel from the source image to copy into that destination image pixel. Because the left and right sides of the book were made vertical during keystone-correction, it can be assumed that the horizontal distortion in the image is already corrected. Accordingly, the horizontal coordinate from the source image chosen for an examined pixel in the destination image can be equivalent to the horizontal coordinate of the examined pixel itself. The flattening unit can correct the vertical distortion by determining a virtual first horizontal line passing through the topmost vertical coordinate of the source image and by determining a virtual second horizontal line passing through the bottommost vertical coordinate of the source image. For each vertical column of pixels in the destination image, a linear function can be determined representing a linear interpolation between the downward shift from the first horizontal line to the top edge of the document in the source image and the upward shift from the second horizontal line to the bottom edge of the document in the source image.

At some point during the image processing, the conversion unit can convert the image to grayscale, black and white, sepia, or to some other desired color palette.

These and other objects, features, and advantages of the processing systems and methods will become more apparent upon reading the following specification in conjunction with the accompanying drawing figures.

BRIEF DESCRIPTION OF THE FIGURES AND APPENDICES

DETAILED DESCRIPTION

Figure 1:
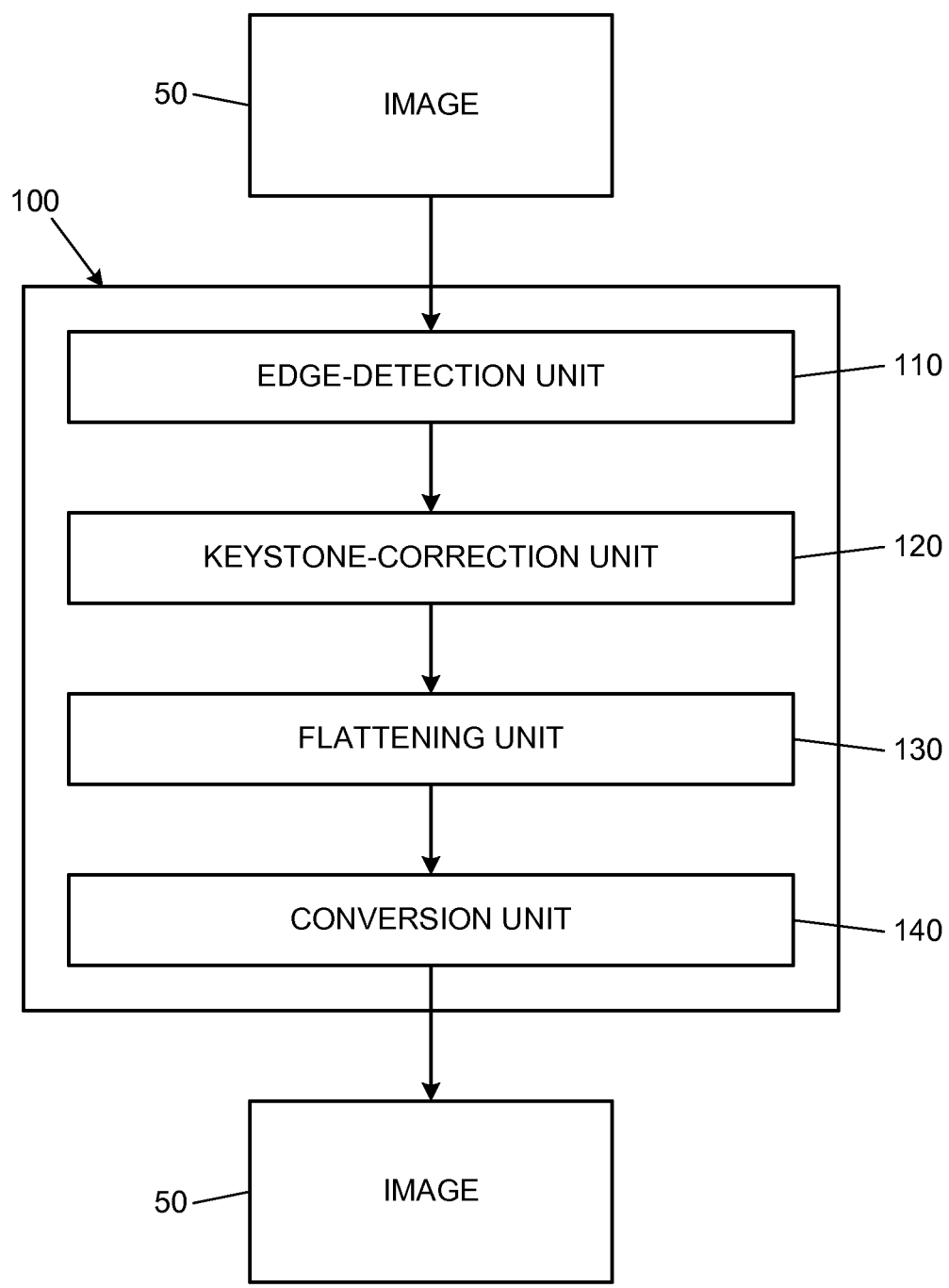
FIG. 1 illustrates a flow diagram of a processing system, according to an exemplary embodiment of the present invention.

To facilitate an understanding of the principles and features of the invention, various illustrative embodiments are explained below. In particular, the invention is described in the context of being a processing system for unbending an image of an open book. Embodiments of the invention, however, are not limited to this context. Rather, various aspects of the present invention can apply to other types of image-processing as well, such as processing images captured of a whiteboard.

The materials and components described hereinafter as making up elements of the invention are intended to be illustrative and not restrictive. Many suitable materials and components that would perform the same or similar functions as the materials and components described herein are intended to be embraced within the scope of the invention. Other materials and components not described herein can include, but are not limited to, for example, similar or analogous materials or components developed after development of the invention.

Various embodiments of the present invention are processing systems and methods for processing images of books or other documents. Referring now to the figures, in which like reference numerals represent like parts throughout the views, various embodiments of the processing systems and methods will be described in detail.

FIG. 1 illustrates a flow diagram of a processing system 100, according to an exemplary embodiment of the present invention. As shown, the processing system 100 can comprise an edge-detection unit 110, a keystone-correction unit 120, a flattening unit 130, and a conversion unit 140. After an image 50 is received by the processing system 100, the image 50 can be processed in turn by each unit. In an exemplary embodiment, processing of the image 50 can proceed from the edge-detection unit 110 to the keystone-correction unit 120, to the flattening unit 130, and then to the conversion unit 140. The resulting image 50 of each unit's processing can be delivered to the next unit in line for further processing. Other embodiments of the invention, however, can conduct image-processing in various other orders.

Generally, the edge-detection unit 110 can identify edges of the book or pages in the image 50; the keystone-correction unit 120 can reduce or remove keystoning in the image 50; the flattening unit 130 can flatten or straighten text or objects in the image 50; and the conversion unit 140 can convert the image 50 to grayscale, black and white, or some other desired color profile.

The units of the processing system 100 can be programs, program modules, or other operative components of the processing system 100. The units can comprise hardware, software, or a combination thereof. Although these units are described herein as being distinct components, this need not be the case. The units are distinguished herein based on operative distinctiveness, but they can be implemented in various fashions, wherein the elements or components making up the various units can overlap or be divided in a manner other than that described herein.

In an exemplary embodiment of the processing system 100, the original image 50 is captured of an open book or other document before processing begins. The image 50 can be captured with an image-capture device, such as a still camera, video camera, flatbed scanner, handheld scanner, or the like.

The image-capture device can be, for example, a camera supported on and integrated with a stand, where the stand can have a flexible or articulated neck. Accordingly, the book and the camera stand can be positioned on a common surface, and the camera can be positioned and angled to capture pages of the book when the book is open. In some embodiments, the camera can comprise one or more of an inclinometer, ultrasound sensor, and auto-focus mechanism. The inclinometer can detect the orientation of the camera relative to the direction of gravity. The ultrasound sensor can detect the distance between the camera and the book. The auto-focus mechanism can, in addition to automatically focusing on the book, provide feedback to the camera regarding the distance from the camera to the book. Data received by the camera from the inclinometer, ultrasound sensor, or auto-focus mechanism can be utilized by some embodiments the processing system 100 to increase efficiency or accuracy during image processing.

In an image 50 captured of an open bound book, facing pages generally extend and curve away from the binding. The distance between the image-capture device and various portions of the pages of the book can vary, as the open face of the book generally cannot be flattened into a plane. As a result, the image 50 captured of the book can include distortions, where the edges and text lines of the book can appear to be curved, stretched, or squished in places. Various exemplary embodiments of the invention can reduce or remove this distortion, thereby increasing legibility and making the image 50 more pleasing to the eye.

Figure 2A:
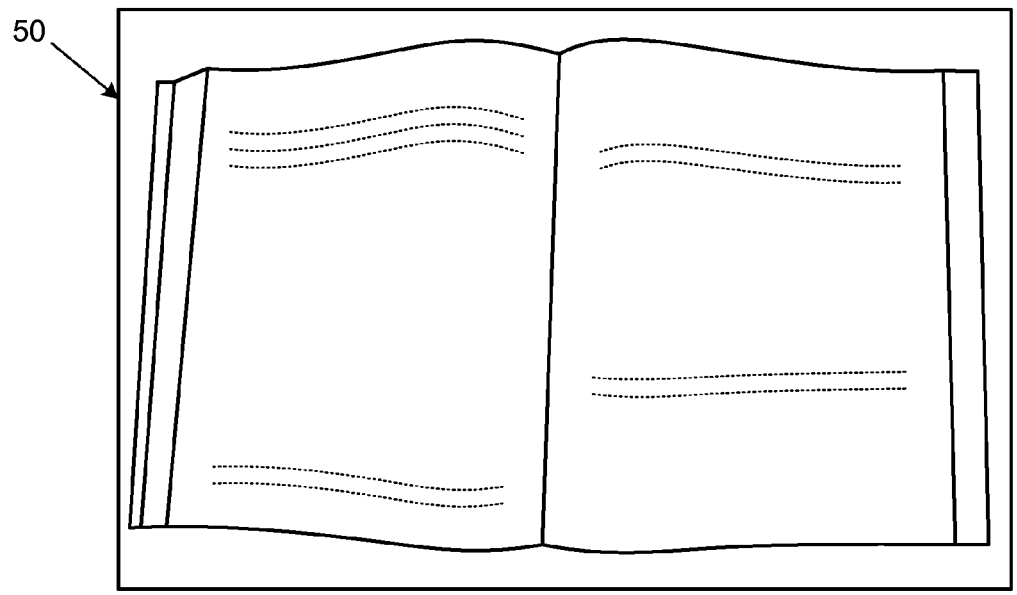
FIGS. 2A-2B illustrate an exemplary result of processing an image by the processing system, according to an exemplary embodiment of the present invention.
Figure 2B:
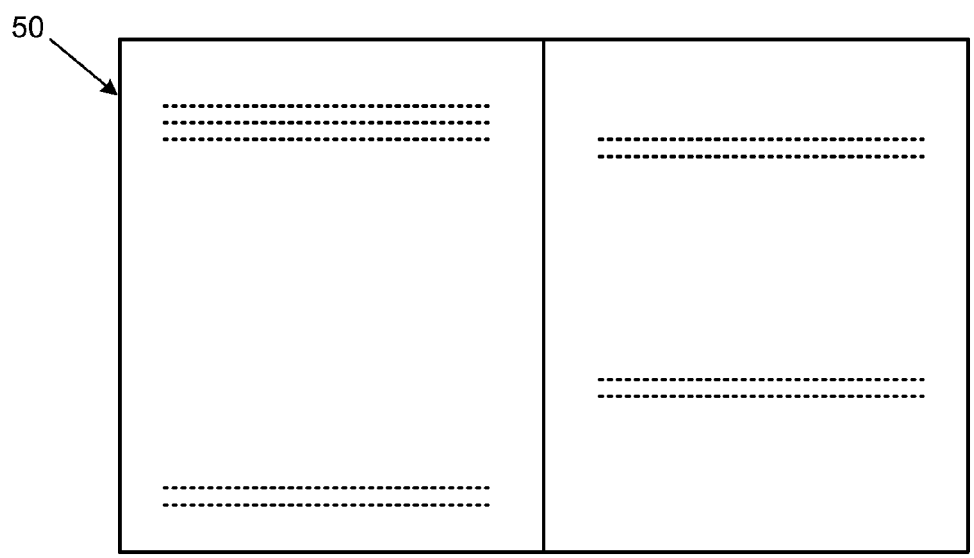

FIGS. 2A-2B illustrate an exemplary result of processing an image 50 by the processing system 100, according to an exemplary embodiment of the present invention. FIG. 2A illustrates an example of an original image 50 of a book captured by an image-capture device, while FIG. 2B illustrates an exemplary result image 50 after processing the original image 50 of FIG. 2A. As shown, the resulting image 50 can comprise one or more pages having left and right edges that are generally vertical, along with text extending in a generally horizontal direction. This resulting image 50 can be easier for a person to read, and if automated character-recognition is desired, the resulting image 50 can lead to more accurate character-recognition results than would the original image 50.

The processing system 100 can be integrated, in whole or in part, in a computing device 300. The processing system 100 can be embodied in a computer-readable medium and executed by a computer processor on a computing device 300 to provide one, some, or all aspects of the invention.

Figure 3:
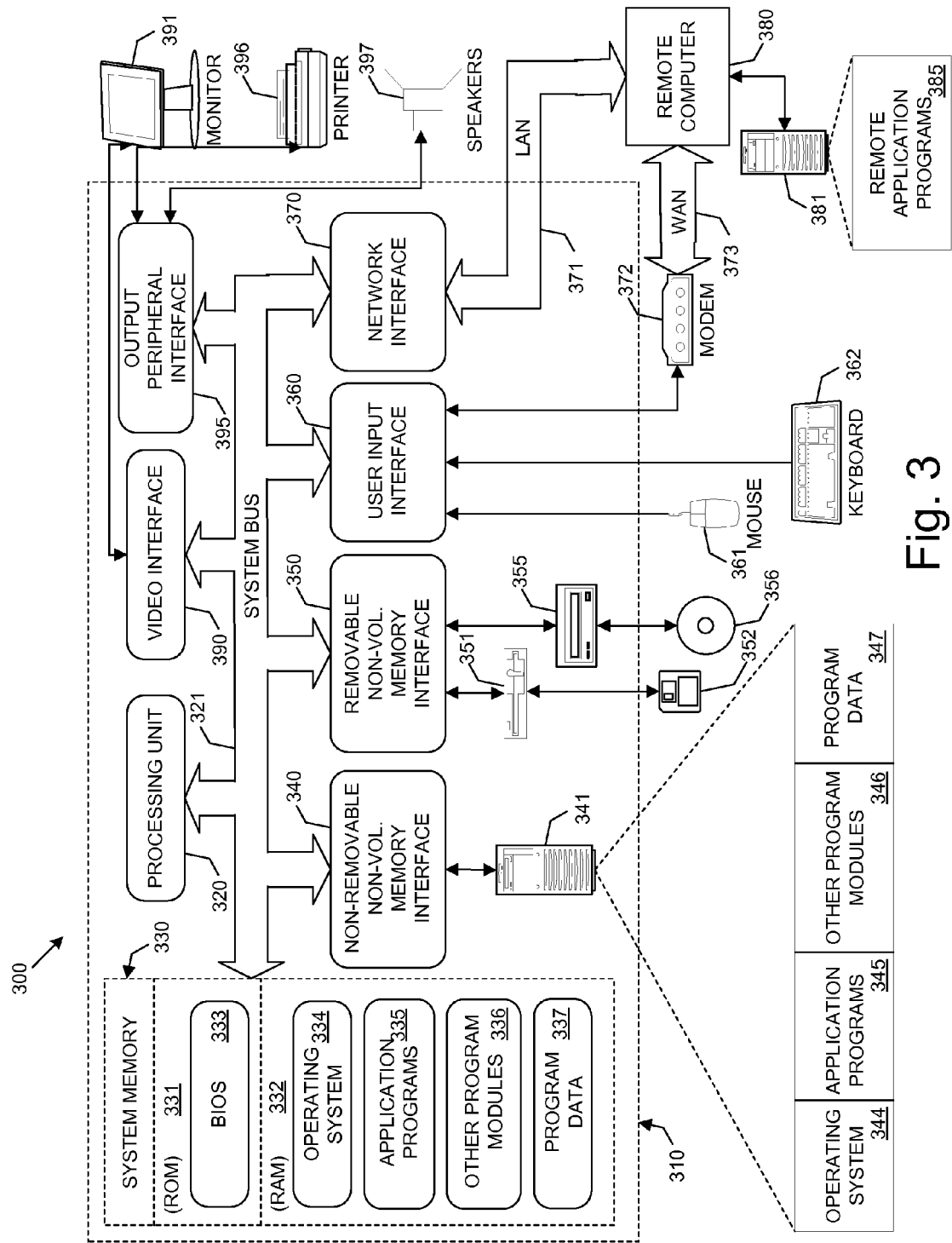
FIG. 3 illustrates an architecture of a computing device in which the processing system can be embodied in whole or in part, according to an exemplary embodiment of the present invention.

FIG. 3 illustrates an architecture of a computing device 300 in which the processing system 100 can be embodied in whole or in part, according to an exemplary embodiment of the present invention. Although specific components of a computing device 300 are illustrated in FIG. 3, the depiction of these components in lieu of others does not limit the scope of the invention. Rather, various types of computing devices can be used to implement embodiments of the processing system 100. Exemplary embodiments of the processing system 100 can be operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, or the like.

With reference to FIG. 3, components of the computing device 300 can comprise, without limitation, a processing unit 320 and a system memory 330. A system bus 321 can couple together various system components, including the system memory 330 to the processing unit 320. The system bus 321 can be any of several types of bus structures including a memory bus or memory controller, a peripheral bus, and a local bus using any of a variety of bus architectures. By way of example, and not limitation, such architectures can include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 300 can include a variety of computer readable media. Computer-readable media can be any available media that can be accessed by the computing device 300, including both volatile and nonvolatile, and both removable and non-removable media. For example, and not limitation, computer-readable media can comprise computer storage media and communication media. Computer storage media can include both volatile and nonvolatile, and removable and non-removable media implemented in any method or technology for storage of information such as computer readable instructions, data structures, program modules, or other data. Computer storage media can include, but is not limited to, RAM, ROM, EEPROM, flash memory, other memory technology, CD-ROM, digital versatile disks (DVD), other optical disk storage, magnetic cassettes, magnetic tape, magnetic disk storage, other magnetic storage devices, or other medium that can be used to store data accessible by the computing device 300.

Communication media can typically contain computer-readable instructions, data structures, program modules, or other data in a modulated data signal, such as a carrier wave or other transport mechanism. The term "modulated data signal" means a signal that has one or more of its characteristics set or changed in such a manner as to encode information in the signal. For example, and not limitation, communication media can include wired media such as a wired network or direct-wired connection, and wireless media such as acoustic, RF, infrared, or other wireless media. Combinations of the above can also be included within the scope of computer readable media.

The system memory 330 can comprise computer storage media in the form of volatile or nonvolatile memory, such as read only memory (ROM) 331 and random access memory (RAM) 332. A basic input/output system 333 (BIOS), containing the basic routines that help to transfer information between elements within the computing device 300, such as during start-up, can typically be stored in the ROM 331. The RAM 332 typically contains data or program modules that are immediately accessible to or presently in operation by the processing unit 320. For example, and not limitation, FIG. 3 illustrates operating system 334, application programs 335, other program modules 336, and program data 337.

The computing device 300 can also include other removable or non-removable, and volatile or nonvolatile computer storage media. By way of example only, FIG. 3 illustrates a hard disk drive 341 that can read from or write to non-removable, nonvolatile magnetic media, a magnetic disk drive 351 for reading or writing to a nonvolatile magnetic disk 352, and an optical disk drive 355 for reading or writing to a nonvolatile optical disk 356, such as a CD ROM or other optical media. Other removable or non-removable, and volatile or nonvolatile computer storage media that can be used in the exemplary operating environment can include magnetic tape cassettes, flash memory cards, digital versatile disks, digital video tape, solid state RAM, solid state ROM, or the like. The hard disk drive 341 can be connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3 can provide storage of computer readable instructions, data structures, program modules and other data for the computing device 300. For example, hard disk drive 341 is illustrated as storing an operating system 344, application programs 345, other program modules 346, and program data 347. These components can either be the same as or different from operating system 334, application programs 335, other program modules 336, and program data 337.

A web browser application program 335, or web client, can be stored on the hard disk drive 341 or other storage media. The web client 335 can comprise an application program 335 for requesting and rendering web pages, such as those created in Hypertext Markup Language ("HTML") or other markup languages. The web client 335 can be capable of executing client side objects, as well as scripts through the use of a scripting host. The scripting host can execute program code expressed as scripts within the browser environment. Additionally, the web client 335 can execute web applications, which can be embodied in web pages.

A user of the computing device 300 can enter commands and information into the computing device 300 through input devices such as a keyboard 362 and pointing device 361, commonly referred to as a mouse, trackball, or touch pad. Other input devices (not shown) can include a microphone, joystick, game pad, satellite dish, scanner, electronic white board, or the like. These and other input devices are often connected to the processing unit 320 through a user input interface 360 coupled to the system bus 321, but can be connected by other interface and bus structures, such as a parallel port, game port, or a universal serial bus (USB). A monitor 391 or other type of display device can also be connected to the system bus 321 via an interface, such as a video interface 390. In addition to the monitor, the computing device 300 can also include other peripheral output devices, such as speakers 397 and a printer 396. These can be connected through an output peripheral interface 395.

The computing device 300 can operate in a networked environment using logical connections to one or more remote computers, such as a remote computer 380. The remote computer 380 can be a personal computer, a server, a router, a network PC, a peer device, or other common network node, and can include many or all of the elements described above relative to the computing device 300. The logical connections depicted in FIG. 3 include a local area network (LAN) 371 and a wide area network (WAN) 373, but can also include other networks.

When used in a LAN networking environment, the computing device 300 can be connected to the LAN 371 through a network interface or adapter 370. When used in a WAN networking environment, the computing device 300 can include a modem 372 or other means for establishing communications over the WAN 373, such as the internet. The modem 372, which can be internal or external, can be connected to the system bus 321 via the user input interface 360 or other appropriate mechanism. In a networked environment, program modules depicted relative to the computing device 300 can be stored in the remote memory storage device. For example, and not limitation, FIG. 3 illustrates remote application programs 385 as residing on memory device 381. It will be appreciated that the network connections shown are exemplary and other means of establishing a communications link between the computers can be used.

Referring now back to FIG. 1, as discussed above, the processing system 100 can comprise an edge-detection unit 110, a keystone-correction unit 120, a flattening unit 130, and a conversion unit 140. These units can be embodied, in whole or in part, in a computing device 300, such as that described above. For example, one or more of these units can be stored on removable or non-removable computer-readable media of the computing device 300, and the units can be in communication with one another and with other components of the computing device 300 as necessary for operation of the processing system 100.

After the processing system 100 receives an image 50 of a document, such as one or more pages of a bound book, the edge-detection unit 110 can process the image 50. The edge-detection unit 110 can apply one or multiple edge-finding algorithms to the image 50 to identify edges of the document within the image 50. In some embodiments, the edge-detection unit 110 need not distinguish between the edges of the outer book cover and the edges of the one or more pages in the image 50. Good results can be achieved regardless of whether the edges of the book cover or the edges of the pages are identified. Accordingly, the term "document" is used herein to refer to the book or one or more pages of the book appearing in the image 50.

An edge-finding algorithm used by the edge-detection unit 110 can utilize a convolution filter. With a convolution filter, the color values of varying groups of pixels can be multiplied by a filter matrix. The values in the filter matrix can be chosen to emphasize certain characteristics of the pixels. In the case of an exemplary edge-detecting convolution filter, when applied to search for generally horizontal edges, each value in a top portion of the filter matrix can be positive, and each value in a bottom portion of the filter matrix can be negative. For example, each value in the top half of the filter matrix can be 1, and each value in the bottom half can be −1. Alternatively, negative values can be on the top, while positive values are on the bottom. The top and bottom of the filter can thus have opposite values of the same magnitude. In some exemplary embodiments, the filter can be applied only to a single channel of the color values of the pixels. For example, and not limitation, the filter can be applied to the green channel, as the green channel may generally comprise the lowest noise of the traditional red, green, and blue color channels when certain cameras are used to capture the original image 50 of the document.

The result of applying the filter to the color values of a set of pixels (i.e., multiplying the filter matrix by the matrix of color values of the set of pixels) in the image 50 can be a matrix of result values. Next, the top set of the result values, which correspond to the pixels multiplied by a first value, can be summed with the bottom set of the result values, which correspond to the pixels multiplied by an opposite second value. Because of the use of opposite values, a uniform original pixel area will result in a sum of approximately zero magnitude. In contrast, if the filter is applied to an edge, where there is contrast between the top and bottom portions of the filtered pixels, then the sum will result in a positive or negative value, the magnitude of which can indicate a degree of change in luminance, or brightness, across the filtered pixels. A positive or negative resulting value can indicate an edge, and the magnitude of the value can indicate the strength, or contrast level, of the edge.

In an exemplary embodiment, the edge-detection unit 110 can apply an edge-finding algorithm one or more times to identify horizontal edges, and one or more times to identify vertical edges. The above example of a convolution filter for edge-finding describes a method of finding horizontal edges. The same or similar filter can be used with the left and right sides, instead of the top and bottom, of the filter being opposite colors to identify vertical edges. In a further exemplary embodiment, an edge-finding algorithm can be applied on only a portion of the image 50. For example, the above convolution filter, or another filter, can be applied from the outside inward, and only a fraction of the image 50 need be examined. For example, and not limitation, the filter can be applied to the top third, bottom third, left third, and right third of the image 50 to respectively identify the top edge, bottom edge, left edge, and right edge of the document in the image 50.

An additional, or alternative, edge-finding algorithm used can be a histogram method. In this algorithm, the edge-detection unit 110 can determine a first histogram representing a band of pixels at the perimeter of the image 50. For example, a set of pixel within a predetermined distance from the perimeter edge of the image 50 can comprise this band. The first histogram can represent the range or tally of colors of the pixels within the band. The edge-detection unit 110 can also determine a second histogram for a set of pixels at or proximate the center of the image 50. For example, the second histogram can be based on the colors of pixels within a predetermined rectangular area centered at or proximate the center of the image 50. A first representative value of the first histogram can be identified, and a second representative value of the second histogram can be identified. For example, and not limitation, a representative value can be an average value, such as a mean, median, or mode of the values making up the respective histogram. A threshold value can be set to the average of the first and second representative values. After the threshold value is calculated, the edge-detection unit 110 can analyze the image 50 from the outside to the inside. A pixel can be deemed part of an edge if that pixel's color value is on one side of the threshold, while a neighboring or proximate pixel's threshold value is on the other side of the threshold value.

In an exemplary embodiment, the edge-detection unit 110 can identify four edges for use by the other units of the processing system 100. Each of the four edges can delineate each of the top, bottom, left, and right of the document in the image 50. In some instances, an edge-finding algorithm can identify more than four edges. In an exemplary embodiment of the edge-detection unit 110, potential edges can be selected liberally, so as to improve the chances of identifying the actual edges of the document. Further, if multiple edge-finding algorithms are used, then more than four total edges can be identified by the combination of algorithms. In this case, the edge-detection unit 110 can apply a predetermined ranking algorithm to the edges identified by the edge-finding algorithms.

The ranking algorithm can consider a combination of one or more of the following factors: length of the edge, smoothness of the edge (e.g., lack of sharp corners), strength of the edge-indicating signal used to select the edge (e.g., magnitude of the sum when using the above convolution filter), closeness of orientation to exact horizontal or vertical, proximity to edge of the image 50, and other factors that may be relevant to whether a detected potential edge is an actual edge of the document in the image 50. An additional factor can be whether a potential edge intersects or nearly intersects one or more other potential edges, as an edge of the document would be expected to meet another edge of the document at a corner of the document. Based on the rankings of the edges, four appropriate edges can be selected by the edge-detection unit 110, including a top edge, a bottom edge, a left edge, and a right edge.

Figure 4:
FIG. 4 illustrates identification of a corner of a document in the image, according to an exemplary embodiment of the present invention.

In some instances, the identified edges may intersect where the pages of the book drop off from the edge of a page to the cover. FIG. 4 illustrates an example of such an instance, in which the edges 450 are depicted with dotted lines. As shown in FIG. 4, a topmost page 410 can have a plurality of other pages 420 between it and the book cover 430. The top page 410 and the other pages 420 can vary in their respective distances to the edge of the cover 430. Accordingly, if the cover 430 is identified as a side edge of the document by the edge-detection unit 110, then the identified top edge or the identified bottom edge may follow the edges of the other pages 420 to intersect the identified edge of the cover 430. The edge-detection unit 110 can detect this drop-off by detecting that one of the edges 450 dips or varies significantly from its path before reaching another edge 450. In this case, the edge-detection unit 110 can automatically extend the edges 450 to intersect at a corner, as shown in FIG. 4.

Figure 5:
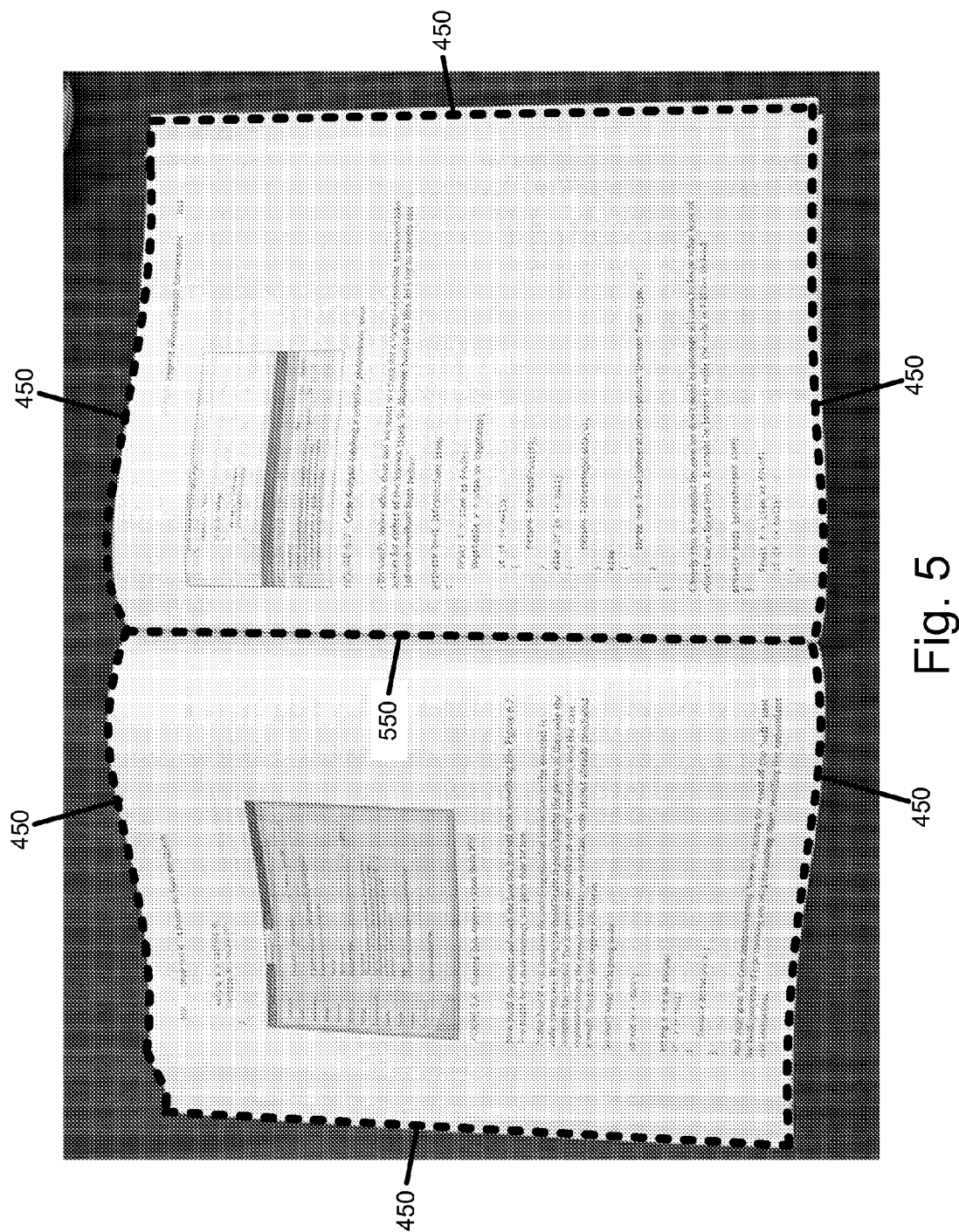
FIG. 5 illustrates an exemplary result of edge-finding in the processing system, according to an exemplary embodiment of the present invention.

FIG. 5 illustrates an exemplary result of edge-finding in the processing system 100, according to an exemplary embodiment of the present invention. In FIG. 5, the identified edges 450 are depicted with dotted lines. As shown in FIG. 5, some embodiments of the edge-detection unit 110 can identify the binding 550 of the book as an edge of each of the facing pages. The edge-detection unit 110 can then identify the three additional edges 450 of each page separately. The binding 550 can be identified by searching for a dark substantially vertical edge proximate the horizontal center of the image 50. To this end, one or more edge-finding algorithms can be used, such as those edge-finding algorithms described above. In contrast to FIG. 5, however, some embodiments of the edge-detection unit 110 can treat the document in the image 50 as a single page, and these embodiments need not find the boundary or binding 550 between two pages in the image 50.

As shown in FIG. 5, the edges 450 of the document may not meet in a rectangle. Rather, the corners can be a combination of acute and obtuse angles, and the edges 450 may be curved. The distortion of the document into these curves and acute and obtuse angles is commonly referred to as keystoning or keystone effect. The keystone-correction unit 120 can reduce the keystoning in the image 50, preferably after the edges 450 of the image 50 are identified.

Figure 6A:
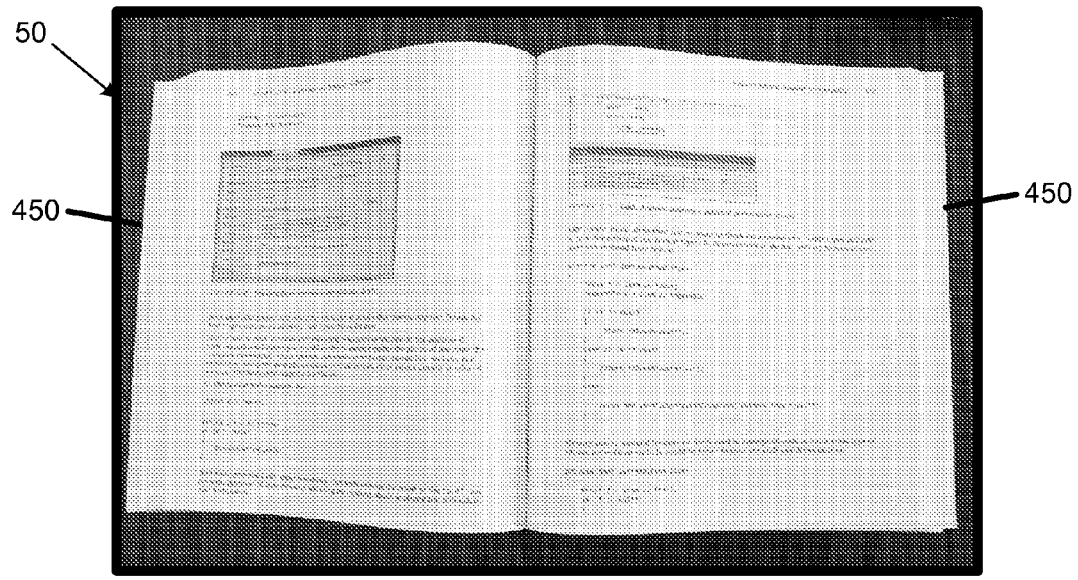
FIGS. 6A-6B illustrate an exemplary result of keystone-correction in the processing system, according to an exemplary embodiment of the present invention.
Figure 6B:
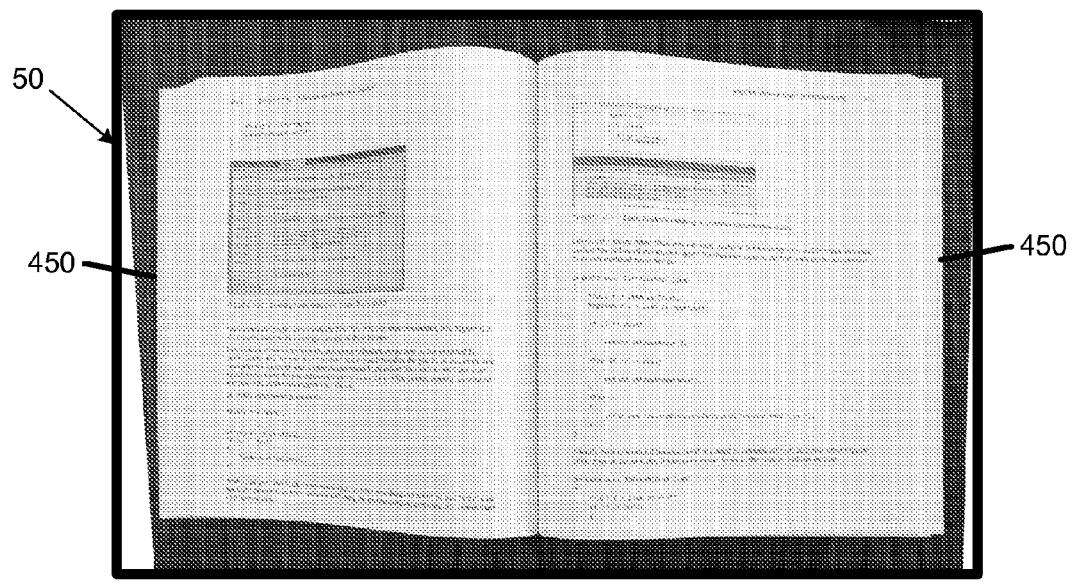

The keystone-correction unit 120 can utilize one or more algorithms to reduce or correct keystoning of the image 50 after the edges 450 are identified. FIGS. 6A-6B illustrate an exemplary result of keystone-correction in the processing system 100, according to an exemplary embodiment of the present invention. As shown, the keystone-correction unit 120 can cause the left and right edges 450 to be vertical, thus correcting the horizontal distortion of the image 50.

Various methods can be used to correct keystoning in the image 50. Some exemplary embodiments of the keystone-correction unit 120 can use one or both of a rotation method and a distortion method. Either or both of these methods can utilize the coordinates of the corners of the document. After the edges 450 of the document are detected, such as by the edge-detection unit 110, the corners of the document can be identified as the intersections of those edges 450. Accordingly, the coordinates of the corners can be available to the keystone-correction unit 120.

The rotation method can be used if the field of view of the image-capture device used to capture the image 50 is known. In that case, the field of view can be used to calculate a series of rotations to apply to the image 50, so as to position the corners of the document into the corners of a rectangle.

In the distortion method, after the corners are identified, the keystone-correction unit 120 can stretch and skew the image 50 so as to position the corners into a rectangle. The left and right edges 450 of the document can be virtually extended in straight lines to the top and bottom of the image 50. Each horizontal row of pixels between these extended edges 450 can be stretched so that each of the horizontal rows is the same length and comprises the same number of pixels, thus placing the left and right extended edges 450 into vertical orientation. The term "stretching" herein includes stretching by a fractional factor, thus resulting in shrinking. In some embodiments, the extended left and right edges 450 of the document can then become, respectively, the left and right sides of the image 50.

After keystone-correction, it can be assumed that the left and right edges 450 of the document are straight and vertical. If either or both of these edges 450 are not straight at this point, some exemplary embodiments of the keystone-correction unit 120 can replace a non-straight left or right edge with a straight vertical line between the appropriate corners of the document.

In some exemplary embodiments of the keystone-correction unit 120, two or more keystone-correction methods can be used to reduce keystoning. For example, the distortion method can be applied to the entire image 50, and the rotation method can be applied to a subset of the image 50, such as the corners only, to confirm that the distortion method performed as expected on at least that subset of the pixels. If the two or more applied methods do not produce sufficiently similar results, then the keystone-correction unit 120 can default to one of the methods used, such as the rotation method.

The flattening unit 130 can reduce the curve of the text that generally results from the pages of a bound book being bent from the binding to the surface upon which the book sits. Because the left and right edges 450 of the book were made vertical during keystone-correction, the flattening unit 130 can assume that the horizontal distortion in the image 50 is already corrected. Accordingly, the flattening unit 130 can vertically flatten the content of the document in the image 50.

To flatten the source image 50 (i.e., the image received by the flattening unit 130), the flattening unit 130 can generate a destination image 50. In some embodiments, the width of the destination image 50 can be the width between the left and right edges 450 of the document, as determined during keystone-correction. Alternatively, if it is desired to create a wider or narrower document than that appearing in the keystone-corrected image 50, the width of the destination image 50 can be selected as a factor of the width of the keystone-corrected image 50. If desired, additional width can be added on one or both sides of the document for aesthetic appeal. Because this additional width lies outside the boundaries of the document, the pixels within the area corresponding to this additional width can be colored as desired, such as in a solid, aesthetically pleasing color. The height of the destination image 50 can be chosen in various manners. For example, in some embodiments, the height of the destination image 50 can be the pixel distance between the topmost pixel of the top edge 450 of the document and the bottommost pixel of the bottom edge 450 of the document in the source image 50.

For each pixel in the destination image 50, the flattening unit 130 can choose a pixel from the source image 50 to copy into that destination image pixel. Thus, for each pixel in the destination image 50 comprising a horizontal coordinate and a vertical coordinate, corresponding horizontal and vertical coordinates of the source image 50 (i.e., the keystone-corrected image) can be identified. The color of the identified source image pixel can then be copied to the destination image pixel currently being examined.

For a particular examined destination image pixel, if the width of the document in the destination image 50 was selected to be the same as the width in the source image 50, then the horizontal coordinate selected from the source can be the same as the horizontal coordinate of the examined destination image pixel. If additional width was added in the destination image 50, or if the width of the document was stretched by a factor in the destination image 50, then a linear mapping can be established based on these modifications. The linear mapping can be fixed across all pixels in the destination image 50, so that identification of the horizontal coordinate for each examined destination image pixel utilizes the same linear mapping to a horizontal coordinate in the source image 50. Accordingly, the flattening unit 130 can maintain the horizontal proportions of the image 50 established by the keystone-correction unit 120.

As shown in FIG. 6B, after keystone-correction, the image 50 can still be distorted vertically. The flattening unit 130 can correct this vertical distortion. For each vertical line of pixels in the destination image 50, the flattening unit 130 can establish and use a linear function mapping the vertical coordinate of an examined pixel to a vertical coordinate in the source image 50. The linear function can change between each vertical line of pixels in the destination image 50, so as to distort each vertical column in a different manner.

Figure 7:
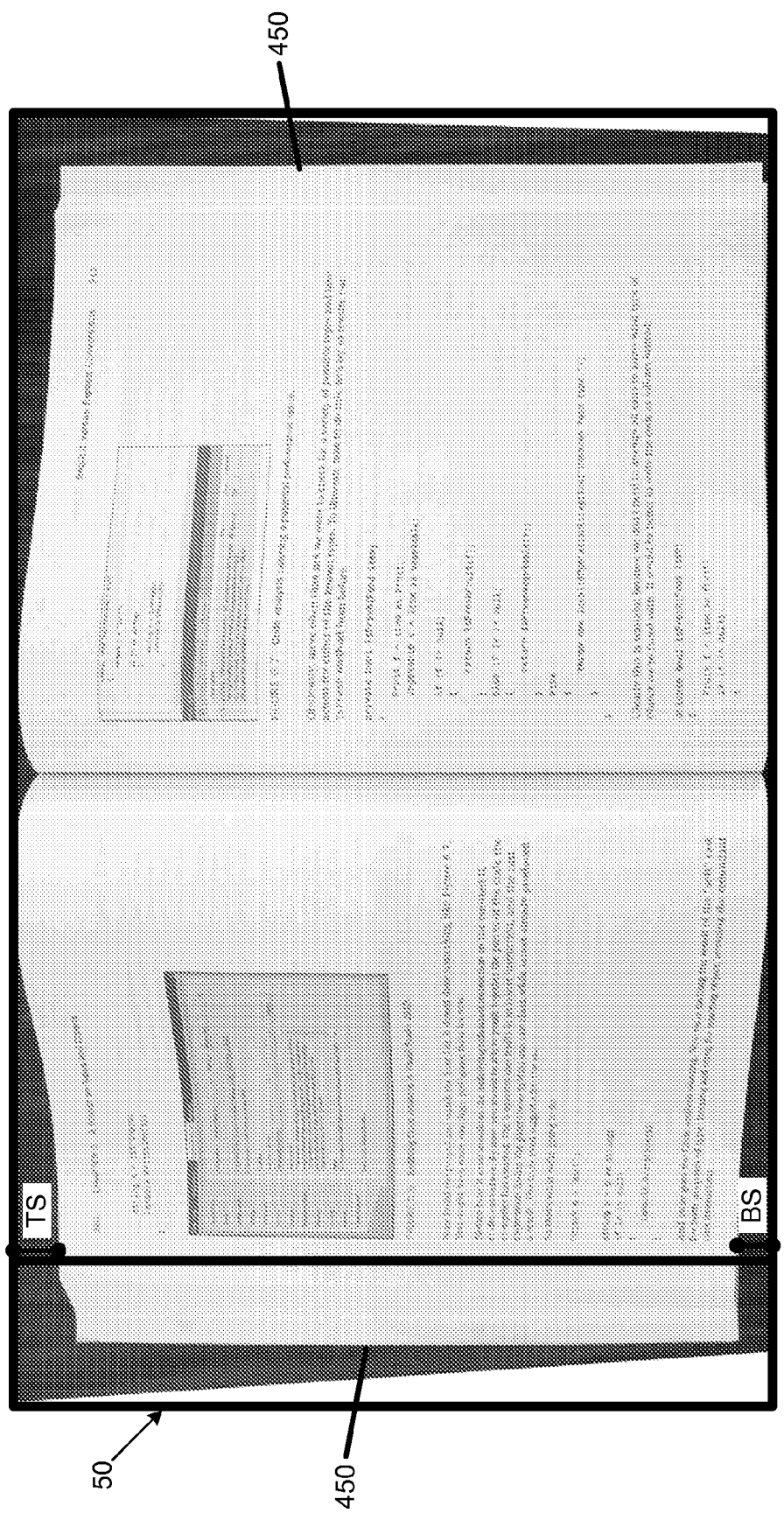
FIG. 7 illustrates an aspect of a flattening unit of the processing system, according to an exemplary embodiment of the present invention.

For each vertical line of pixels in the destination image 50, a top shift and a bottom shift can be determined based on the vertical line at the corresponding horizontal coordinate of the source image 50. The top shift can be the pixel distance between (a) the pixel of top edge of the document lying on the corresponding vertical line of the source image 50 and (b) the topmost pixel of the entire document in the source image 50. The bottom shift can be the pixel distance between (a) the pixel of the bottom edge of the document lying on the corresponding vertical line of the source image 50 and (b) the bottommost pixel of the document in the source image 50. FIG. 7 illustrates the top shift TS and bottom shift BS for a vertical line in a source image 50, according to an exemplary embodiment of the present invention. The vertical coordinate in the source image chosen for each pixel on the corresponding vertical line of the destination image 50 can be the vertical coordinate of that destination image pixel shifted by a linear interpolation between the top shift and the bottom shift. For example, where $Y_d$ is the vertical coordinate of the examined destination image pixel, and where H (not shown in figures) is the height of the document in the destination image 50, the following function $S(Y_d)$ can be used to identify the vertical coordinate of the corresponding vertical line of the source image 50:

$$S(Y_d) = Y_d + TS^*(1 - Y_d/H) + BS^*(Y_d/H).$$

Application of the above, or other appropriate, function to the vertical coordinate of each pixel in the destination image 50 to identify the corresponding vertical coordinate in the source image 50 can correct vertical distortion of the source image 50.

The conversion unit 140 can convert the image 50 to a particular color palette, such as grayscale, black and white, other monochromatic, sepia, or other desired color palette. Although an exemplary embodiment of the conversion unit 140 can process the image 50 after edge-detection, keystone-correction, and flattening, this need not be the case. Rather, color-conversion can be performed at various alternative steps of the processing system 100.

Black and white conversion can be useful for text documents. Conversion to black and white can be performed by turning black all pixels darker than a predetermined threshold value and turning white all pixels lighter than a predetermined threshold value. The threshold value can be selected to be, for example, an average value of all pixel colors in the document.

In some exemplary embodiments, the color palette to which the image 50 is converted can at least partially depend on the type of document in the image 50, or the source material of the document, which can be detected by the processing system 100. For example, and not limitation, if the processing determines that the document was positioned at a distance greater than a threshold distance from the image-capture device, then the processing system 100 can assume that the document type and source material is a whiteboard or other display board. In that case, the conversion unit 140 can brighten the various colors of the document, so as to make the colors aesthetically appealing and so as to make different colors easily distinguishable from one another. For another example, if it is determined that a portion of the document depicts an image or other non-text object, then that portion of the document can be excluded from color-conversion, or a different color-conversion treatment can be applied to that portion as compared to a text portion of the document.

Figure 8A:
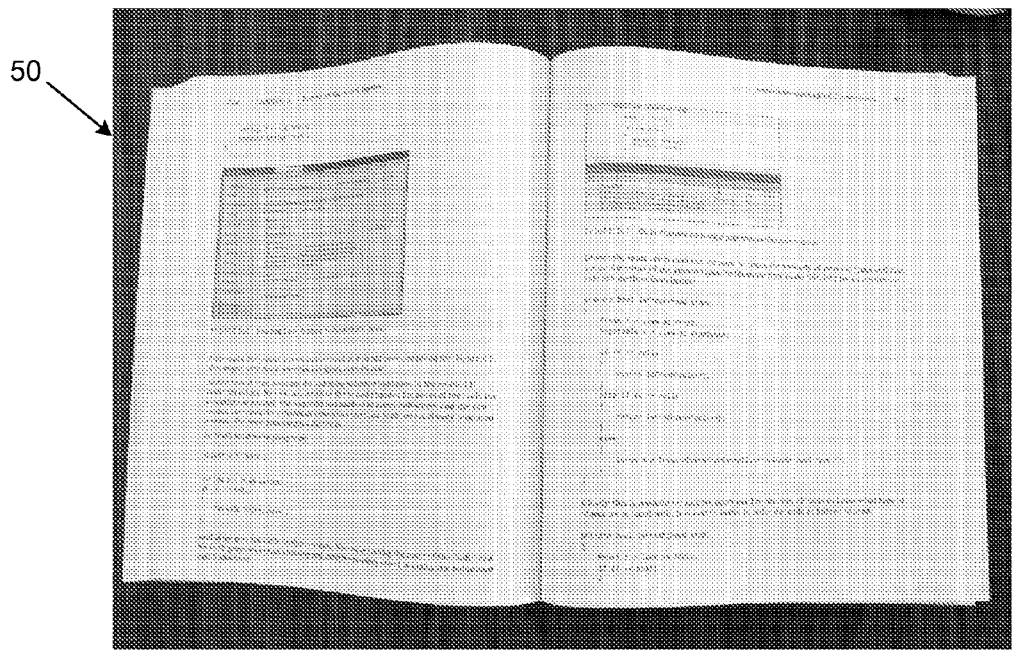
FIGS. 8A-8B are photographs of an exemplary result of processing an image by the processing system, according to an exemplary embodiment of the present invention.
Figure 8B:
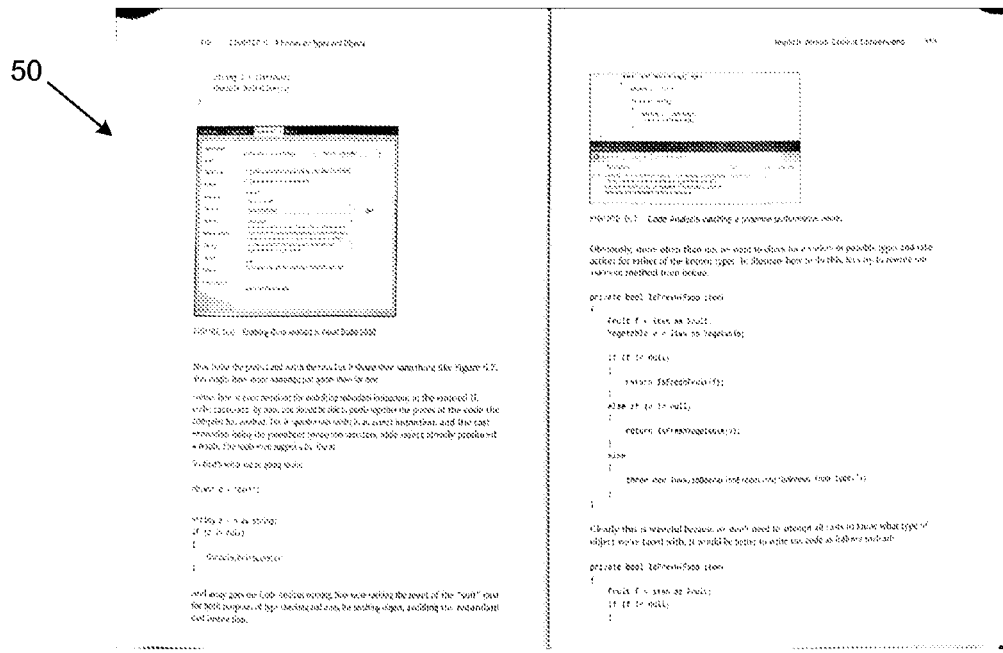

FIGS. 8A-8B are photographs of an exemplary result of the processing system, according to an exemplary embodiment of the present invention. FIG. 8A illustrates an initial image 50 of a book captured by a camera, while FIG. 8B illustrates a resulting image 50, which can be the result of processing the initial image 50 through the processing system 100. As shown in FIG. 8A, the pages of the book in the initial image 50 can be distorted as a result of various factors, including, for example, the camera position and orientation, properties of the camera lens, and inability to place the pages of the book into a plane. As shown in FIG. 8B, the processing system 100 can reduce distortion to provide a more easily readable and eye-pleasing image.

Accordingly, as discussed in detail above, processing systems and methods according to embodiments of the present invention can unbend and enhance images of book pages and other documents, so as to enable a more pleasant reading experience and more accurate character-recognition of the pages.

While various embodiments of the processing systems and methods have been disclosed in exemplary forms, many modifications, additions, and deletions can be made without departing from the spirit and scope of the invention and its equivalents, as set forth in claims to be filed in a later non-provisional application.

What is claimed is:

1. A computer-implemented method, comprising:
receiving a source image of a document;
transforming the image to transform two opposing edges of the document into substantially parallel opposing edges;
identifying a plurality of vertical lines in the source image between the substantially parallel opposing edges; and
flattening one or more curved entire rows of text appearing in the source image, wherein flattening the one or more curved entire rows of text comprises mapping the plurality of vertical lines to corresponding vertical lines in a destination image, and mapping the plurality of vertical lines comprises vertically distorting two or more of the plurality of vertical lines differently to straighten the one or more curved entire rows of text.

2. The method of claim 1, wherein transforming the image to transform two opposing edges of the document into substantially parallel opposing edges comprises:
identifying a set of edges of the document in the source image; and
performing keystone-correction on the source image.

3. The method of claim 1, wherein transforming two opposing edges into substantially parallel opposing edges comprises transforming two opposing edges into substantially vertical opposing edges.

4. The method of claim 1, wherein mapping the plurality of vertical lines to corresponding vertical lines in a destination image comprises:
creating the destination image;
identifying a first vertical line in the destination image;
identifying a corresponding second vertical line in the source image; and
for each current pixel of a plurality of pixels in the first vertical line of the destination image, calculating a pixel in the first vertical line to copy into the current pixel,
wherein the second vertical line comprise pixel values from the first vertical line, and wherein the pixel values are rearranged in the second vertical line as compared to the first vertical line.

5. The method of claim 4, wherein calculating a pixel in the first vertical line to copy into the current pixel comprises performing a linear interpolation.

6. The method of claim 1, further comprising converting the destination image to a selected color palette.

7. The method of claim 1, further comprising identifying a source material of the document.

8. The method of claim 7, wherein identifying a source material of the document comprises determining a distance between the source material and an image-capture device used to capture the source image.

9. The method of claim 7, further comprising:
selecting a color palette from among a plurality of available color palettes, wherein the selection is based on the source material of the document; and
converting the destination image to the selected color palette.

10. A system, comprising:
an edge-detection unit configured to identify at least two opposing edges of a document appearing in a source image;
a keystone-correction unit configured to transform the source image such that the at least two opposing edges are made substantially vertical; and
a flattening unit configured to flatten one or more curved entire rows text in the document, wherein flattening the one or more curved entire rows of text comprises directing a computer processor to determine, for each of a plurality of vertical lines between the at least two opposing edges, a vertical distortion, and vertically distorting each of the plurality of vertical lines based on the determination to straighten the one or more entire rows of text in a created destination image, wherein each vertical line in the destination image comprises rearranged data from at least one corresponding vertical line of the source image.

11. The system of claim 10, the flattening unit being configured to straighten the one or more entire lines of text in the created destination image to form one or more substantially straight entire lines of text.

12. The system of claim 10, the flattening unit being configured to transform a top edge and a bottom edge of the document into substantially horizontal lines.

13. The system of claim 10, the flattening unit being further configured to set a pixel value for each current pixel of a plurality of pixels in a first vertical line of the destination image, wherein the pixel value is a copy of a corresponding pixel in the corresponding vertical line of the source image.

14. The system of claim 13, the flattening unit being configured to calculate coordinates of the corresponding pixel using a linear function of the coordinates of the current pixel.

15. The system of claim 10, the keystone-correction unit being configured to:
receive data from an image-capture device used to capture the source image; and
transform, using the received data, the source image such that the two opposing edges are made substantially vertical.

16. The system of claim 10, further comprising a conversion unit configured to determine a source material of the document and to convert the destination image to a predetermined color palette associated with the source material.

17. A non-transitory computer-readable medium storing instructions that, when executed by a processor, cause a computing device to perform functions including:
providing two vertical edges of a document appearing in a source image, the source image comprising a first plurality of vertical lines between the vertical edges;
creating a destination image comprising a second plurality of vertical lines;
copying, to each of the second plurality of the vertical lines in the destination image, a plurality of pixel values from a corresponding vertical line in the source image, wherein each vertical line the second plurality of vertical lines is a transformation of the corresponding vertical line in the source image; and
flattening one or more curved entire rows of text in the document, wherein flattening the one or more curved entire rows of text comprises determining, at each of the second plurality of vertical lines in the destination image, one or more of a top shift and a bottom shift, and vertically shifting the pixels in one or more of the second plurality of vertical lines based on the determination to straighten the one or more entire rows of text.

18. The computer-readable medium of claim 17, wherein each vertical line of the second plurality of vertical lines is a linear transformation of the corresponding vertical line in the source image.

19. The computer-readable medium of claim 17, wherein providing two vertical edges of a document appearing in a source image comprises identifying two opposing edges of the document.

20. The computer-readable medium of claim 19, wherein providing the two vertical edges of the document appearing in a source image further comprises performing keystone-correction on the source image to transform the two opposing edges into vertical lines.

* * * * *